United States Patent [19]
Heising et al.

[11] 3,883,818
[45] May 13, 1975

[54] METAL-VAPOR LASER WITH IMPROVED VAPOR CONDENSING MEANS

[75] Inventors: Steven James Heising, San Jose; Mark W. Dowley, Palo Alto; William A. Shull, Portola Valley, all of Calif.

[73] Assignee: Coherent Radiation, Palo Alto, Calif.

[22] Filed: Apr. 27, 1973

[21] Appl. No.: 354,988

[52] U.S. Cl. ............ 331/94.5 G; 313/225; 313/326; 313/356
[51] Int. Cl. ........................... H01s 3/22; H01s 3/05
[58] Field of Search.................... 331/94.5; 330/4.3; 313/225, 227, 356, 326

[56] References Cited
UNITED STATES PATENTS

| 3,639,804 | 2/1972 | Hernqvist | 331/94.5 X |
| 3,755,756 | 8/1973 | Silfvast | 331/94.5 |

Primary Examiner—Robert J. Webster
Attorney, Agent, or Firm—Limbach, Limbach & Sutton

[57] ABSTRACT

A metal-vapor laser includes means for reversing the direction of the electrical discharge as it leaves the discharge-confining bore tube to separate the transported vaporized metal from the active discharge region prior to condensation.

13 Claims, 3 Drawing Figures

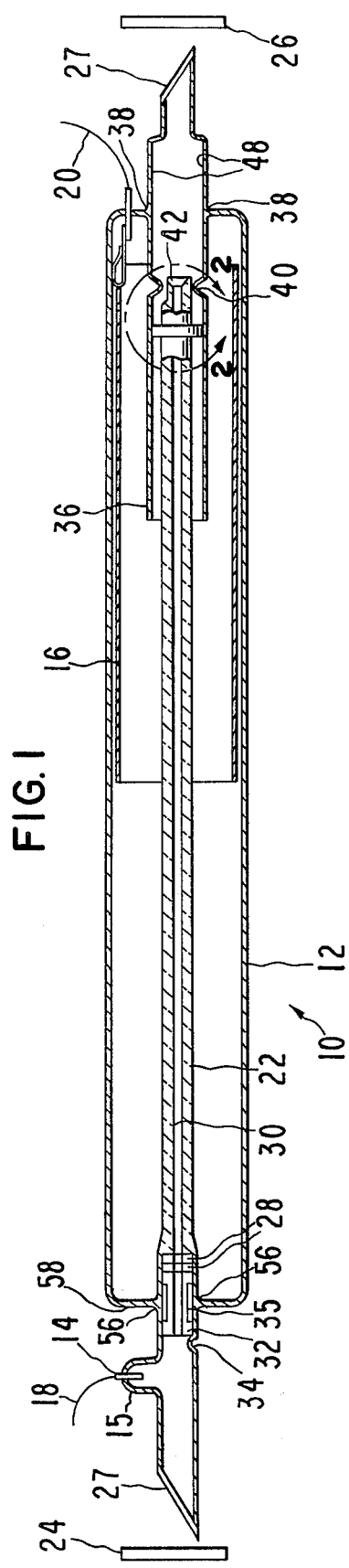
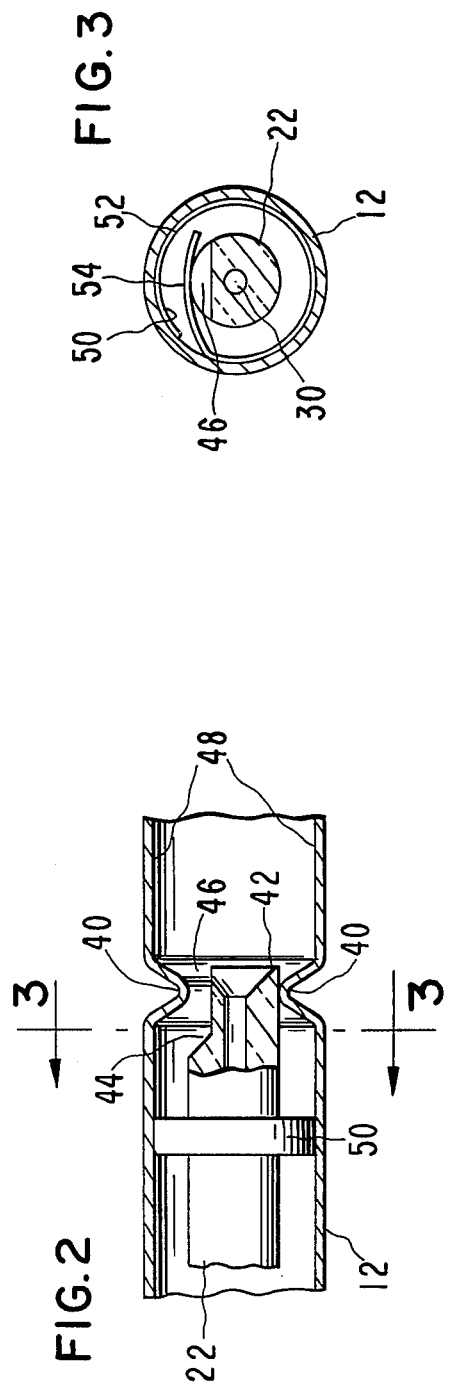

METAL-VAPOR LASER WITH IMPROVED VAPOR CONDENSING MEANS

BACKGROUND OF THE INVENTION

The present invention relates to gas lasers and, in particular, to gas lasers wherein one or more of the constituents within the laser is in the vapor state while functioning as the active laser medium, but which thereafter condenses out of the vapor state.

A class of gaseous lasers which have received much interest recently are frequently referred to as metal-vapor lasers. Such lasers include the helium-cadmium, helium-selenium, helium-cesium and helium-mercury lasers. One common feature of each of these lasers is that the active lasing ingredient, i.e. the metal, is not in the vapor state at normal ambient atmospheric temperatures. Thus, in each case, the active ingredient must be vaporized to a sufficient pressure for the laser to operate. The helium serves as a means of transferring energy to the vaporized metal atoms in a manner well-known to those skilled in the laser art.

The helium-cadmium and helium-selenium lasers are of particular interest. Both are relatively simple to construct and operate, and there appear to be many applications for each. The helium-cadmium laser provides two strong, continuous wave outputs, one at 4416 A. (blue) and another at 3250 A. (ultraviolet). The helium-selenium laser is attractive since it produces many strong lines in different parts of the spectrum, including blue, green, yellow, orange, red and infrared. For a more information about the history, background and theory of operation of metal-vapor lasers, reference is made to an article entitled "Metal-Vapor Lasers" by William T. Silfvast, *Scientific American*, Feb. 1973, pages 89–97.

In the operation, for example, of a typical helium-cadmium laser, the cadmium which at normal room temperatures is a solid is heated sufficiently to cause a high enough pressure of the cadmium vapor for lasing action to occur. Since the pressure within the laser envelope is considerably less than atmospheric pressure, this occurs more readily than would be the case at atmospheric pressures. The vaporized cadmium is mixed with the helium, normally within a discharge confining bore tube, by cataphoretic movement of the ionized cadmium atoms from the anode towards the cathode.

The cadmium vapor does not condense on the walls of the discharge-confining bore tube because the temperature of the electrical discharge is sufficiently hot to prevent condensation. In one early helium-cadmium laser, the vaporized cadmium ultimately condenses as a film on the inside of an enlarged co-axially aligned appendage of the discharge tube whose wall temperatures are inherently cooler than the walls of the remainder of the discharge bore tube. See U.S. Pat. No. 3,614,658 to Goldsborough.

A problem encountered with such early helium-cadmium lasers is the rapid loss of helium from the gas mixture within the discharge tube. In an article entitled "Helium Clean-up in Helium-Cadmium Laser Discharge" in the August 1971 edition of IEEE *Journal of Quantum Electronics*, pp. 425–426, A. P. Sosnowski and M. B. Klein reported that the loss of helium is due to condensation of the cadmium in the region of the active discharge. They reported that helium ions, formed in the active discharge region, are buried, by condensing cadmium. Where condensation of the cadmium occurred outside of the active discharge region, burial of the helium did not occur. They concluded that helium is only susceptible to burial when in the ionized form.

Klein and Sosnowski in the article cited above and in U.S. Pat. No. 3,663,892 describe several structures for causing the spent cadmium to condense in regions of the tube outside the active discharge region. In one embodiment, the cathode is located in an appendage extending transversely to the major length of the discharge-confining discharge tube. At the point where the appendage intersects the discharge tube, the diameter of the discharge tube is larger than the rest of the discharge tube.

In order to prevent condensation in the area of this intersection, which is in the region of the active discharge, insulation is provided around the intersection so that the condensation of the cadmium vapor occurs further along the enlarged part of the bore tube and out of the active region of the tube. While this causes most of the cadmium to condense in an area outside of the active discharge, some of the cadmium can follow the discharge into the cathode appendage and ultimately condense within that appendage and within the vicinity of the active discharge region. Consequently, burial of the helium ions occurs.

In another embodiment described by Klein and Sosnowski, the condensation of the cadmium occurs in a cool temperature region behind the cathode. This embodiment requires a heated cathode to prevent condensation in the area of the active discharge region.

SUMMARY OF THE INVENTION

It is, therefore, and object of the present invention to provide an improved metal-vapor laser having improved means for causing condensation of the metal vapor outside of the active discharge region.

Another object of the present invention is to provide a metal vapor laser utilizing a cold cathode.

Another object of the present invention is to provide improved means for preventing burial of helium by condensing vapor constituent.

In accordance with the present invention, means are provided for separating the transported vaporized constituent from the active discharge region, prior to condensation, by reversing the direction of the electrical discharge at the point where the discharge exits from the discharge-confining bore tube.

Immediately after the current direction is reversed, the discharge passes through a restricted passageway. The vaporized constituent, traveling along the bore tube due to cataphoretic forces, continues to flow axially of the bore tube as it exits therefrom. Because of the change in direction and the restricted passageway which the discharge current undergoes, the exiting vapor can't "follow" the active discharge and is separated therefrom.

Thereafter, the vapor is permitted to condense and, since it does so in a region remote from the active discharge, helium ions are not "buried".

In some gas lasers, particularly gas lasers utilizing a cylindrical cathode concentrically surrounding a part or all of the discharge-confining bore tube, a cup-shaped or umbrella-shaped member concentrically surrounds the cathode end of the discharge-confining bore tube between the bore tube and the cathode. The purpose of the umbrella member is to re-direct or distribute the discharge so that the current does not impinge on a single spot or area of the cathode near the end of the bore tube.

In one embodiment of the present invention, this umbrella member is utilized in separating the transported vapor from the active discharge region.

In accordance with the present invention, helium ion burial is prevented in a very simple and efficient manner without resort to use of hot cathodes or bulky insulation.

While the embodiment of the present invention described herein specifically relates to metal-vapor lasers, it should be understood that the present invention is not intended to be so limited. The present invention is applicable to other lasers having a non-gaseous constituent which is in the vapor state during the operation of the laser.

BRIEF DESCRIPTION OF THE DRAWINGS

FIG. 1 is a cross-sectional view of a laser incorporating the present invention.

FIG. 2 is an enlargement of a part of the laser of FIG. 1.

FIG. 3 is a cross-sectional view of the enlargement of FIG. 2 in a direction indicated by the arrows.

DESCRIPTION OF THE PREFERRED EMBODIMENT

A laser 10 incorporating the present invention is shown in FIG. 1. Located at one end of a gas-containing envelope or discharge tube 12 is an anode 14 situated in an anode appendage 15. Envelope 12 is made of a suitable material such as pyrex glass. A cylindrically-shaped cathode 16 is enclosed at the other end of the envelope 12. Lead wires 18 and 20 are connected respectively to the anode 14 and the cathode 16.

The cylindrical cathode 16 is axially aligned with and surrounds the end of a discharge-confining bore tube 22. The purpose of the bore tube 22 is to concentrate the electrical discharge between the anode 14 and the cathode 16 within a relatively small volume and thereby increase the current density through the gaseous lasing medium within the discharge tube 12.

Axially aligned with the bore tube 22 is an optical resonator comprising a totally reflecting mirror 24 and an output mirror 26 which transmits a small percentage of the light impinging upon it.

The ends of the discharge tube envelope 12 are sealed by means of a pair of Brewster windows 27 in a manner well-known to those skilled in the art. However, it should be understood that the present invention is equally applicable to a laser where the optical resonator forms an integral part of the discharge tube 12. In this case, then, the Brewster windows 27 are replaced with the optical resonator mirrors 24 and 26.

Situated near the anode end of the discharge tube 12 are a pair of washers 28 each having a central aperture axially aligned with the discharge path 30. Washers 28 are held in place by a generally cylindrically-shaped insulating insert 32 having a central bore aligned with the bore tube 22. Insert 32 is maintained in place against washers 28 by a crimp 34 in the wall of the gas envelope near the cathode. Insert 32 also has a circumferentially-extending recess 35 which aids in preventing unwanted vapor condensation on or in the vicinity of Brewster window 27.

The material from which washers 28 are made is the metal or other normally non-gaseous constituent which must be vaporized for the operation of laser 10. In the helium-cadmium laser embodiment shown, the washers 28 are made of the metal cadmium. The washers 28 are exposed to the electrical discharge between the anode 14 and the cathode 16. The heat of this discharge causes the cadmium washers 28 to slowly vaporize.

Also confined within the envelope 12 is the gaseous element helium. The discharge between the anode 14 and the cathode 16 excites the helium to an elevated energy state from which energy is imparted to the vaporized cadmium atoms. This causes the cadmium to ionize and to be excited to the required energy levels required for lasing action. The ionized cadmium atoms are then transported along the length of the discharge confining bore tube 22 toward the cathode end of the tube due to cataphoresis in a manner well-known to those skilled in the art. The cataphoretic transportation of the cadmium also provides additional mixing with the excited helium atoms.

Surrounding the cathode end of the bore tube 22 is a generally cylindrical umbrella member 36 made of an electrically insulating material such as pyrex. Cylindrical member 36 forms a part of and is supported by the envelope 12 at 38. The purpose of the cylindrical member 36 is to distribute the current of the electrical discharge so that all of the current does not strike or impinge upon the cathode at a single spot or area.

Current distributing member 36 has a circumferentially-extending dimpled-ridge or waist 40. Member 36 with the dimpled-ridge 40 serves two functions. First, it serves as a support and retainer for the open end 42 of the discharge-confining bore tube 22. The aperture defined by the dimpled-ridge 40 maintains the bore tube 22 in proper radial alignment with respect to the optical resonator mirrors while at the same time allowing for variations in thermal expansion rates of the bore tube 22 and the envelope 12.

The second purpose can best be seen by referring additionally to FIG. 2 and 3. The open end 42 of the bore tube 22 has a cut-out portion 44 which in combination with the dimpled-ridge 40 forms a restricted passageway 46. To prevent burial of helium ions, it is necessary to cause condensation of the spent cadmium to occur outside of the area of the active discharge region. The electrical discharge between the anode 14 and the cathode 16 is reversed as it leaves the end of 42 by the surrounding umbrella member 36. Immediately after the discharge current reverses, it passes through the restricted passageway 46. As previously explained, the vaporized cadmium flows from the anode end of the bore tube 22 along the bore tube 22 and out of the open end 42 by virtue of cataphoresis. Because of the momentum of the vaporized cadmium atoms, the flow of the vaporized cadmium out of the open end 42 of the bore tube 22 can not follow the path of the reversed discharge current through the restricted passageway 46.

The spent cadmium then condenses in region 48 outside of the active discharge region. The temperature of the region 48 is cooler than the temperature in the bore tube since it is removed from the area of the discharge region. Hence, the condensation of the cadmium occurs in an area where helium ions do not exist and helium burial is thereby prevented. The region 48 is made with a larger diameter than bore tube aperture 30 so that the condensing cadmium is out of the way of the light reflected between mirrors 24 and 26 so that the laser mode will not be adversely affected.

Because of the recess 44 in the bore tube 22, a spring bias clip 50 shown in FIGS. 1–3 is used to force the bore tube 22 snugly against the dimpled ridge. The spring clip 50 has a main circular portion 52 which fits against the inside surface of the cylindrical member 16. A second portion 54 is juxtapositioned with and forces the bore tube 22 against a section of the ridges waist 40.

As explained previously, the heat of the discharge causes continuous evaporation of the cadmium from the pair of cadmium washers 28. Since the discharge power is inversely related to the cadmium vapor pressure, the system is self-regulating once a proper cadmium temperature is established, with a current regulated power supply.

In the embodiment described, the geometry of the discharge tube envelope 12 is utilized for establishing the operating temperature of the cadimum washers 28. The envelope 12 is joined and sealed to the discharge-confining bore tube 22 at 56 by means of a disc or cap member 58. It has been found that by properly positioning the cap member 58 in relation to the cadmium washers 28, the heat dissipation from the cadmium washers can be controlled and hence an operating temperature established. That is, if a lower vapor pressure of cadmium is required, the distance between the cap 58 and the washers 28 is reduced. Similarly, if greater cadmium vapor pressure is required, the distance between the junction 56 and the cadmium washers 28 is increased.

While it is believed that the above description of the invention is sufficient to enable one skilled in the arts to duplicate the same, the following table of parameters for an actual embodiment of the discharge tube 12 is provided:

TABLE A

| | |
|---|---|
| Helium pressure | 3–7 torr. |
| Cadmium vapor pressure | $10^{-2}$ torr. |
| Anode/Cathode voltage | 1500 volts |
| Discharge tube parameters: | |
| Length (between Brewster windows 27) | 455 mm. |
| O.D. (in region of bore tube) | 41 mm. |
| Envelope end cap 58/cadmium slug separation | 7–10 mm. |
| Envelope thickness | 2 mm. |
| Bore tube parameters | |
| O.D. 7.5 mm. | |
| I.D. 1.5 mm. | |

We claim:
1. A gas laser comprising:
   a. means for enclosing a lasing medium comprising at least one normally non-gaseous constituent which is in the vapor state during the operation of the laser;
   b. an anode and a cathode and a direct current electrical discharge therebetween through said lasing medium;
   c. a bore tube for confining said discharge and having an open end at the cathode end of the laser;
   d. an optical resonator axially aligned with at least a part of said electrical discharge path;
   e. means for transporting said vaporized constituent along said bore tube in the direction of said open end of said bore tube;
   f. means for causing condensation of said vaporized constituent outside the region of said electrical discharge comprising physical barrier means for reversing the path of said direct current electrical discharge as the electrical discharge exits from said open end of said bore tube to separate said electrical discharge from said transported vaporized constituent; and
   g. means for accepting the condensation of the spent vaporized constituent outside of the region of the discharge after said transported vaporized constituent exits from said open end of said bore tube and is separated from said electrical discharge.

2. A gas laser as in claim 1 wherein said direction changing means comprises a cup-shaped member axially aligned with and concentrically surrounding said open end of said bore tube, said cup-shaped member having an aperture through which said open end of said bore tube extends, and including a restricted passageway between said open end of said bore tube and the remainder of the concentrically arranged cup-shaped member to allow the passage of said electrical discharge.

3. A gas laser as in claim 2 wherein said cathode comprises a cylindrical elongated cathode surrounding at least a part of said bore tube and said cup-shaped member.

4. A gas laser as in claim 3 wherein said non-gaseous constituent is a metal.

5. A gas laser as in claim 3 wherein said non-gaseous constituent is cadmium.

6. A gas laser as in claim 1 wherein said condensation means additionally includes means for passing said reversed discharge through a restricted passageway.

7. A gas laser as in claim 6 wherein said non-gaseous constituent is a metal.

8. A gas laser as in claim 6 wherein said non-gaseous constituent is cadmium.

9. In a metal-vapor laser having a gas containing envelope, an optical resonator, an anode and a cylindrical cathode, a discharge-confining bore tube, a current-distributing umbrella member concentrically surrounding the cathode end of said bore tube, and means for transporting said vaporized metal along said bore tube in the direction of an open end thereof, and wherein the improvement comprises means for utilizing said umbrella member for separating said transported vaporized metal from said discharge to insure condensation outside of the discharge region.

10. A metal-vapor laser as in claim 4 wherein said umbrella member is sealed to said bore tube at the open end thereof except for a restricted passageway therebetween, and wherein said separating means comprises means for reversing the direction of the discharge as it leaves the open end of said bore tube and passing the reversed current through said restricted passageway.

11. A gas laser as in claim 10 wherein said non-gaseous constituent is a metal.

12. A gas laser as in claim 10 wherein said non-gaseous constituent is cadmium.

13. A gas laser as in claim 9 wherein said optical resonator forms a part of said gas-containing envelope.

* * * * *